Nov. 7, 1933.    O. F. E. WINBERG    1,934,339
ORCHARD HEATER
Filed Dec. 7, 1931

INVENTOR
O. F. E. WINBERG
BY Milo B. Stevens and Co.
ATTORNEYS

Patented Nov. 7, 1933

1,934,339

UNITED STATES PATENT OFFICE 1,934,339

ORCHARD HEATER

Oscar F. E. Winberg, Silverhill, Ala.

Application December 7, 1931. Serial No. 579,614

6 Claims. (Cl. 126—59.5)

My invention relates to improvements in heaters, and especially orchard heaters.

An important object is to design a heater for the purpose of generating sufficient heat in orchards and vineyards to prevent frost from injuring or killing trees, vines, or shrubs.

Another object of my invention is to provide a frusto-conical shaped heater, the design of which permits the nesting of the heaters and the storing of the same in a minimum amount of space.

A further object is to provide a portable stove which is simple, cheap to manufacture and which is made out of sheet-iron and adapted for use of such fuel as charcoal, coke, or any other substance capable of generating a high degree of heat.

A still further and important object is to provide novel supporting legs for the heater, the legs providing fuel oil pockets or cups for lighting purposes.

Another object is to provide means whereby the oil pockets are arranged in such position that at the time of lighting the heater, the heat will be very intense and uniformly distributed, thus insuring quicker generation of heat.

A still further object is to provide novel combined legs and fuel receptacles or pockets with means for the easy removal and replacement of the legs from the casing of the stove to permit the knocking down of the heater for storing purposes.

Another object is to provide a grate for the heater which is adapted to be mounted upon the supporting legs of the heater.

With these and other objects in view, the invention consists of certain novel features of construction as hereinafter shown and described.

In the accompanying drawing forming a part of this application and in which like numerals are employed to designate like parts in all views, Figure 1 is a perspective view of my invention;

Figure 1:
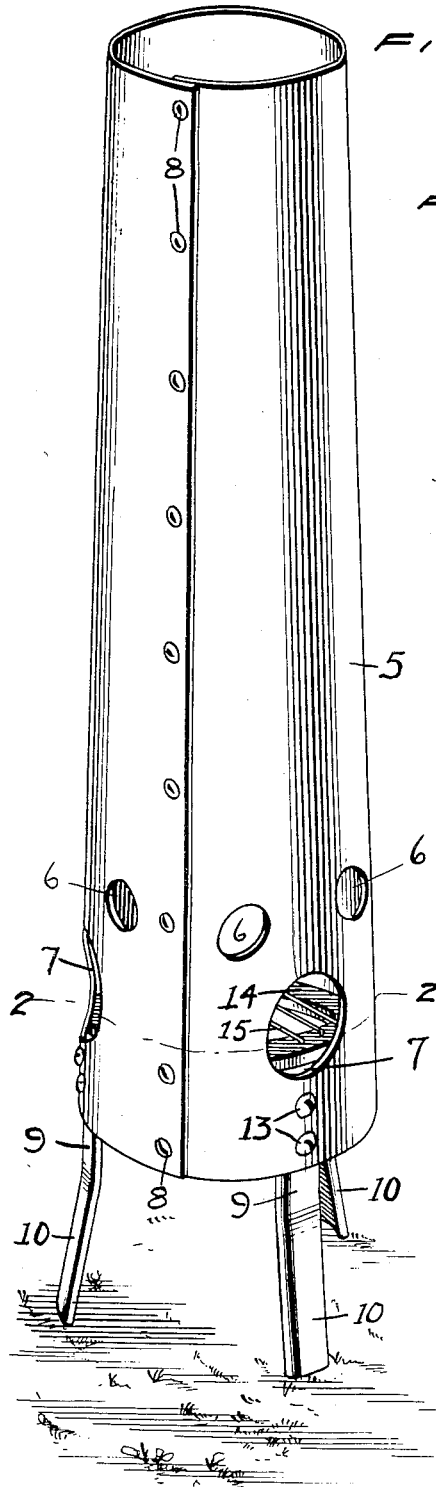
Figure 2:
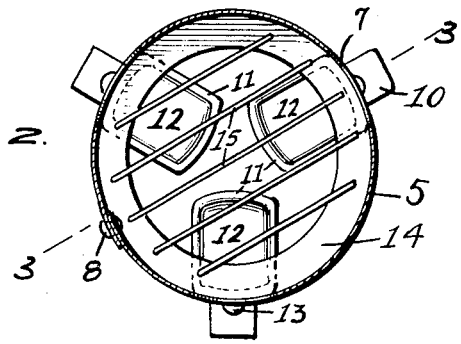
Figure 2 is a view taken on the line 2—2 of Fig. 1.
Figure 3:
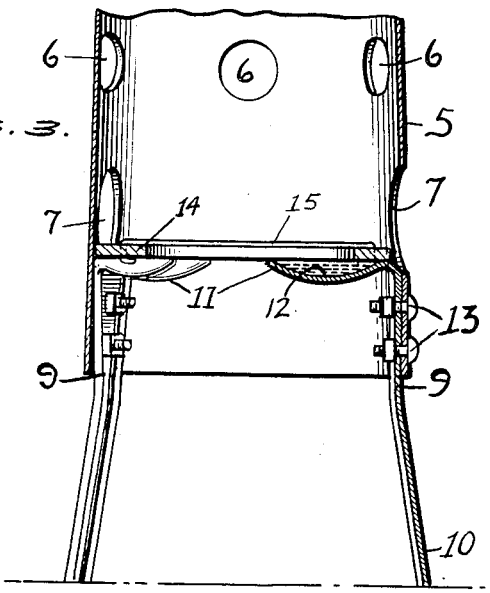
Figure 3 is a fragmentary elevational view of my invention taken on line 3—3 of Fig. 2.
Figure 4:
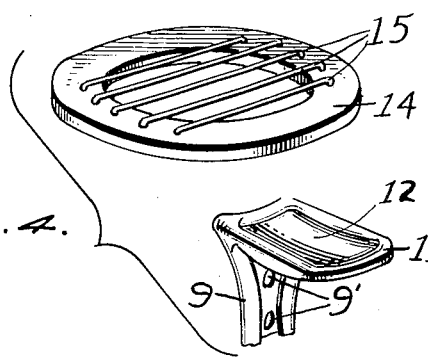
Figure 4 is a composite view showing the grate and a fragmentary view of one of the supporting legs provided with an oil pocket.

In the drawing wherein for the purpose of illustration is shown a preferred embodiment of my invention the numeral 5 designates the casing of my heater which is open at both ends and which is preferably made of sheet iron. The casing is of a tapered or frusto-conical shape to permit the heaters to be nested in the storing or shipping of the same. The lower end of the casing is provided with openings,—6 designating an annular set of draft openings, and 7 the fuel receiving and fuel lighting openings. As will be noted from the drawing the casing is made from a single blank of material and rolled into the desired form and held by rivets 8. I do not, however, limit myself to such a construction as various other means for securing the ends of the blank together may be adopted; such as, by spot welding, etc.

9 designates the supporting legs of the heater having apertures 9′ for permitting assembling of the legs to the casing 5. Each leg flares outwardly at the bottom as indicated at 10, in order that the heater may rest securely on the ground and not blow over so easily. The supporting legs 9 are angularly bent at their top portions as indicated at 11, the angular portions providing a dished out or cup portion 12 for retaining fuel oil for lighting purposes. As will be noted the angular portions are arranged within the casing 5, while the flaring portions 10 extend outwardly of the casing to the ground. It will also be noted that the fuel openings 7 are arranged directly opposite the oil cup portions 12 so that easy access to the cup portions can be had for filling the cups with oil and for lighting the same.

The legs 9 are secured to the casing 5 by the removable fastening elements 13. This feature is desirable when storing away the heaters in summer. By removing the legs the frusto-conical shape of the heater permits the nesting of the stoves in a minimum amount of space.

Upon the portions 11 of the legs 9 a grate 14 is arranged. The grate 14 is preferably of cast iron provided with spaced grate bars 15 of heavy wire or the like. As will be apparent the supporting legs, besides providing the oil cups or pockets 12, provide supporting means for the grate.

In use, coke, briquettes, charcoal or any similar fuel is placed within the heater 5 upon the grate 14. Fuel oil is then placed through the openings 7 into each of the cup portions 12 of the legs 9. The heater, which is placed in an orchard or vineyard, may then be lighted by applying a flame through the openings to the oil in each cup portion. As will be seen, uniformly distributed lighting of the coke or the like is had which causes evenly distributed heat which, in turn, lessens the liability of the frost or cold weather from doing harm to the orchard or vineyard. Combustion readily takes place in the heater inasmuch as openings 6 provide draft means as well as the supporting of the casing 5 upon the legs 9 which permits the draft to enter up through the bottom of the heater through the grate to the coke or the like.

The novel arrangement of the various parts of my invention gives a very desirable and efficient orchard heater.

It is to be understood that the form of my invention herewith shown and described is to be taken as a preferred embodiment of the same, and that various change in shape, size and arrangement of parts may be resorted to without departing from the spirit of my invention and the scope of the subjoined claims.

Having thus described my invention, what I claim is:

1. A heater comprising a casing having an annular set of draft apertures and oil receiving openings therein, supporting legs for said casing, said legs provided with oil receiving cups arranged opposite the oil receiving openings and a removable grate adapted to rest upon the supporting legs.

2. A heater comprising a frusto-conical casing having apertures arranged therein, supporting legs for said casing, said legs removably attached to said casing, angular portions formed integrally with said legs and having dished out portions for providing oil receiving pockets, and a grate arranged upon said angular portions.

3. In a device of the character described, a casing having oil receiving openings, supporting means for said casing, said supporting means consisting of legs, each leg arranged opposite an oil receiving opening and having an angular portion, said portion providing means for holding a supply of oil.

4. In a device of the character described, a casing provided with apertures arranged at its lower portion, supporting legs for said casing, said legs flaring outwardly at their bottoms and provided with an angular portion at their tops, said angular portions arranged within the casing and located directly opposite openings in the casing, and provided with oil receiving pockets, and a grate disposed upon and supported by said legs.

5. A heater comprising a casing having openings therein, legs for supporting said casing, each leg secured to the inner wall of the casing and having a fuel cup at its top extremity, said cup arranged opposite an opening in the casing to receive a supply of fuel.

6. The structure of claim 5 characterized by the lower portion of each leg flaring outwardly.

OSCAR F. E. WINBERG.